(12) United States Patent
Hagen et al.

(10) Patent No.: US 8,880,399 B2
(45) Date of Patent: Nov. 4, 2014

(54) UTTERANCE VERIFICATION AND PRONUNCIATION SCORING BY LATTICE TRANSDUCTION

(75) Inventors: Andreas Hagen, Stegaurach (DE); Bryan Pellom, Erie, CO (US)

(73) Assignee: Rosetta Stone, Ltd., Harrisonburg, VA (US)

( * ) Notice: Subject to any disclaimer, the term of this patent is extended or adjusted under 35 U.S.C. 154(b) by 433 days.

(21) Appl. No.: 12/890,753

(22) Filed: Sep. 27, 2010

(65) Prior Publication Data
US 2012/0078630 A1 Mar. 29, 2012

(51) Int. Cl.
*G10L 15/08* (2006.01)
*G09B 19/06* (2006.01)
*G10L 15/02* (2006.01)
*G10L 15/187* (2013.01)

(52) U.S. Cl.
CPC .......... *G09B 19/06* (2013.01); *G10L 2015/025* (2013.01); *G10L 15/187* (2013.01)
USPC ........................... 704/236; 704/242; 704/255

(58) Field of Classification Search
CPC ....... G10L 15/08; G10L 15/083; G10L 15/10; G10L 15/19
USPC ................. 704/231, 236, 239, 242, 251, 254, 704/256.4, 271, 255; 434/185
See application file for complete search history.

(56) References Cited

U.S. PATENT DOCUMENTS

| | | | |
|---|---|---|---|
| 5,791,904 A * | 8/1998 | Russell et al. | 434/185 |
| 5,797,123 A * | 8/1998 | Chou et al. | 704/256.5 |
| 7,149,690 B2 * | 12/2006 | August et al. | 704/270 |
| 7,181,398 B2 * | 2/2007 | Thong et al. | 704/254 |
| 7,318,029 B2 * | 1/2008 | Coyle et al. | 704/231 |
| 7,437,290 B2 * | 10/2008 | Danieli | 704/251 |
| 7,634,406 B2 * | 12/2009 | Li et al. | 704/257 |
| 7,640,161 B2 * | 12/2009 | Morris et al. | 704/258 |
| 7,831,425 B2 * | 11/2010 | Acero et al. | 704/251 |
| 7,912,699 B1 * | 3/2011 | Saraclar et al. | 704/270 |
| 8,036,893 B2 * | 10/2011 | Reich | 704/257 |
| 8,645,135 B2 * | 2/2014 | Hagen et al. | 704/243 |
| 2004/0006468 A1 * | 1/2004 | Gupta et al. | 704/254 |
| 2005/0010412 A1 | 1/2005 | Aronowitz | |
| 2006/0015339 A1 | 1/2006 | Charlesworth et al. | |
| 2006/0064177 A1 * | 3/2006 | Tian et al. | 700/1 |
| 2006/0095262 A1 * | 5/2006 | Danieli | 704/251 |
| 2006/0129397 A1 * | 6/2006 | Li et al. | 704/245 |
| 2006/0190259 A1 * | 8/2006 | Jeong et al. | 704/256 |

(Continued)

OTHER PUBLICATIONS

International Search Report and Written Opinion, dated Feb. 15, 2012 of International Application No. PCT/US2011/53448, filed: Sep. 27, 2011.

(Continued)

*Primary Examiner* — Martin Lerner

(57) ABSTRACT

In the field of language learning systems, proper pronunciation of words and phrases is an integral aspect of language learning, determining the proximity of the language learner's pronunciation to a standardized, i.e. 'perfect', pronunciation is utilized to guide the learner from imperfect toward perfect pronunciation. In this regard, a phoneme lattice scoring system is utilized, whereby an input from a user is transduced into the perfect pronunciation example in a phoneme lattice. The cost of this transduction may be determined based on a summation of substitutions, deletions and insertions of phonemes needed to transducer from the input to the perfect pronunciation of the utterance.

19 Claims, 1 Drawing Sheet

(56) References Cited

U.S. PATENT DOCUMENTS

| | | | |
|---|---|---|---|
| 2006/0293886 A1* | 12/2006 | Odell et al. | 704/231 |
| 2007/0055524 A1* | 3/2007 | Cao et al. | 704/257 |
| 2007/0067173 A1* | 3/2007 | Bellegarda | 704/260 |
| 2007/0122792 A1* | 5/2007 | Galley et al. | 434/353 |
| 2007/0185713 A1* | 8/2007 | Jeong et al. | 704/254 |
| 2008/0126089 A1* | 5/2008 | Printz et al. | 704/235 |
| 2008/0147404 A1* | 6/2008 | Liu et al. | 704/256.2 |
| 2008/0183462 A1 | 7/2008 | Ma et al. | |
| 2009/0076817 A1* | 3/2009 | Jeon et al. | 704/240 |
| 2009/0164218 A1* | 6/2009 | Ma | 704/254 |
| 2010/0070278 A1* | 3/2010 | Hagen et al. | 704/255 |
| 2010/0121642 A1 | 5/2010 | Hori et al. | |
| 2011/0218802 A1* | 9/2011 | Bouganim et al. | 704/211 |
| 2014/0205974 A1* | 7/2014 | Pellom et al. | 434/157 |

OTHER PUBLICATIONS

T.J. Hazen and I. Bazzi, A comparison and combination of methods for OOV word detection and word confidence scoring, IEEE International Conference on Acoustics, Speech and Signal Processing ("ICASSP"), May 7, 2001.

E. Tsiporkova, F. Vanpoucke, H. Vanhamme, Evaluation of various confidence-based strategies for isolated word rejection, IEEE-ICASSP, 2000.

T. Kawahara, C.H. Lee, B.H. Juang, Combining Key-Phrase Detection and Subword-based Verification for Flexible Speech Understanding, IEEE-ICASSP, 1997.

G. Zweig and J. Nedel, Empirical Properties of Multilingual Phone-to-Word Transduction, IEEE-ICASSP, 2008.

C. White, G. Zweig, L. Burget, P. Schwarz, H. Hermansky, Confidence Estimation, OOV Detection and Language ID Using Phone-to-Word Transduction and Phone-Level Alignments, ICASSP, 2008.

* cited by examiner

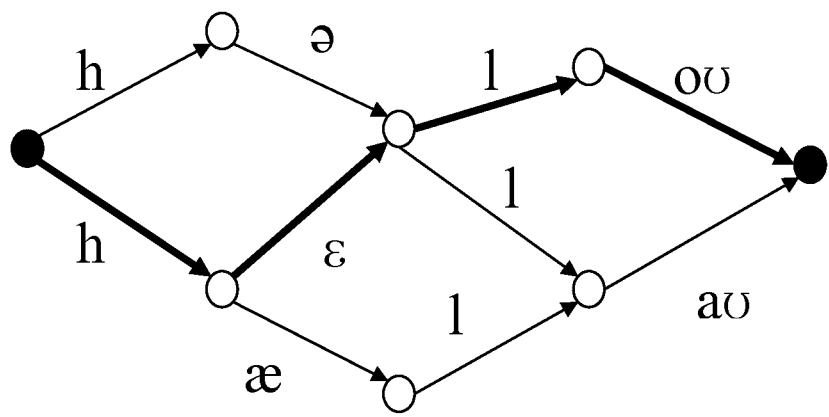

UTTERANCE VERIFICATION AND PRONUNCIATION SCORING BY LATTICE TRANSDUCTION

FIELD OF THE INVENTION

The present invention is in the field of language learning systems. Proper pronunciation of words and phrases being an integral aspect of language learning, determining the proximity of the language learner's pronunciation to a standardized, i.e. 'perfect', pronunciation is utilized to guide the learner from imperfect toward perfect pronunciation.

BACKGROUND OF THE INVENTION

In language learning systems, non-native speakers are asked to pronounce phrases the system prompts or plays first, i.e. in parroting mode. Some speakers pronounce words and phrases more accurately than others, some of a speaker's attempts might be better than others. In order to rate an attempt's pronunciation validity and pronunciation quality (with some modifications regarding thresholding and calibration) it is important to compare a speaker's utterance to target expected words or phrases. This is sometimes called utterance verification.

A phoneme is a group of slightly different sounds which are all perceived to have the same function by speakers of the language or dialect in question.

Various algorithms regarding utterance verification have been developed. There are two broad categories of techniques: Confidence measures and utterance verification. Confidence measures assign a probability to an utterance based on language modeling and acoustic evidence. Examples of such systems can be found in T. J. Hazen and I. Bazzi, *A comparison and combination of methods for OOV word detection and word confidence scoring*, IEEE International Conference on Acoustics, Speech and Signal Processing ("ICASSP"), 2001 and E. Tsiporkova, F. Vanpoucke, H. Van Hamme, *Evaluation of various confidence-based strategies for isolated word rejection*, IEEE-ICASSP, 2000.

Utterance verification methods not using confidence scores use in-grammar and out-of-grammar phrases based on which a likelihood test ratio is computed. See, e.g., T. Kawahara, Chin-Hui Lee, Biing-Hwang Juang, *Combining Key-Phrase Detection and Subword-based Verification for Flexible Speech Understanding*, IEEE-ICASSP, 1997. Phoneme-to-word transduction for speech recognition is, for example, presented in G. Zweig and J. Nedel. *Empirical Properties of Multilingual Phone-to-Word Transduction*, IEEE-ICASSP, 2008 and C. White, G. Zweig, L. Burget, P. Schwarz, H. Hermansky, *Confidence Estimation, OOV Detection and Language ID Using Phone-to-Word Transduction and Phone-Level Alignments*, ICASSP, 2008.

SUMMARY OF THE INVENTION

The method presented in this work is novel as it uses the transduction cost from a phoneme sequence (or in general subword unit) level representation, representing the user input precisely, to the desired input word sequence. A phoneme lattice may be created based on an input set of sounds from a user. The lattice is then transduced to the desired target phoneme sequence. The transduction cost (substitution, deletion, and insertion costs) are accumulated and reported.

A good pronunciation attempt will have low transduction cost. A bad attempt will have high transduction cost. Speaking out of grammar (i.e.; saying the wrong word) will have the highest transduction cost. The utterance verification system will make a decision about the validity of the attempt based on the cost of transducing the recognized phoneme sequence to a known expected phoneme sequence.

BRIEF DESCRIPTION OF THE DRAWINGS

FIG. 1 shows a phoneme lattice for the word "hello".

DETAILED DESCRIPTION OF THE PREFERRED EMBODIMENT

A phoneme lattice in automatic speech recognition is a data structure comprised of recognized phoneme instances tagged with begin and end times, and further scores like the acoustic model and language model score. These phoneme instances are a product of the Viterbi search process, i.e. a dynamic programming algorithm for finding the most likely sequence of hidden states. It is straightforward to transform a lattice into a directed acyclic graph (DAG), an example of which is shown in FIG. 1. Every path from the begin-node to the end-node of the lattice represents one potential phoneme sequence for the word "hello". The best phoneme sequence needs to be determined by a search through this lattice. Acoustic scores, language model scores, and, in the case of a phoneme lattice, phoneme confusion scores guide the search through the lattice for the optimal final word sequence (represented by its phoneme sequence).

Phoneme-to-word transduction is used in this framework. Transduction is used to determine the most likely word sequence based on a phoneme lattice (or sequence). Let $p_c$ be the recognized phoneme lattice. Let $w_i$ and $p_i$ be the intended word sequence and phoneme sequence, respectively. The transduction process can be mathematically formalized as:

$$\operatorname*{argmax}_{w} P(w \mid p_c) \approx \operatorname*{argmax}_{w, p_i} P(w) P(p_i \mid w) P(p_c \mid p_i)$$

$P(w)$ is the probability of the word sequence determined by the language model. $P(p_i|w)$ is probability of the intended pronunciation given the word sequence (available through a pronunciation model). $P(p_c|p_i)$ is the phone level error model, often represented by a confusion probability matrix. It represents the probability of the speech recognizer confusing phoneme c with phoneme i. The transduction process results in the most likely word sequence given the observed phoneme lattice.

In the problem domain of computer based pronunciation scoring an important step is utterance verification. Utterance verification is the decision whether a pronunciation attempt was valid, meaning the user tried to say the right phrase (in-grammar) versus the user completely failed to pronounce the phrase, had a technical problem, or made an attempt to fool the system (out-of-grammar).

In order to give accurate feedback on the validity and quality of a pronunciation attempt it is important to accurately hear what the user really said. The actual phoneme lattice based result of the pronunciation attempt should therefore be optimized to capture the user input as well as possible. The accurate representation can be supported by accent adjusted acoustic models of the target language for example. It is important to have an accurate representation (phoneme lattice) of the user's input in order to precisely estimate an attempt's accuracy.

Since the user is usually prompted with the text he or she is supposed to say or asked to repeat a speech sample, the target word or phoneme sequence is known to the system. The transduction approach can be applied in order to transform the phoneme lattice to the target phoneme sequence. Along with the transduction process comes a transduction cost, which will be low for good pronunciation attempts, e.g. by native speakers, and will be high for bad attempts with lots of substitutions, deletions, and insertions of phonemes. This transduction cost can be used as a means of rating the nativeness or overall accuracy of the pronunciation attempt. This is one novel aspect of this invention.

The transduction process can be based on scores for phoneme substitutions, deletions, and insertions. These scores are usually stored in a phoneme confusion matrix. The more likely two phonemes are to be confused with one another, the lower their substitution costs are. This is because the particular confusion is a likely event and should therefore not be heavily penalized.

A very beneficial output of the transduction process is the phoneme alignment of lattice phonemes to target phonemes. Based on this alignment, phoneme substitutions, deletions, and insertions can be reported and used in the assessment/classification of the user. A Japanese user for example will very likely have different phoneme production patterns from a French user, when producing English phrases. These pronunciation patterns are a side-product of the transduction process and can be used in order to verify assumptions about expected difficulties or collect statistics for later reports and/or actions.

The transduction process outputs absolute transduction scores. In order to sort out valid pronunciation attempts, i.e. the user tried to say the phrase vs. invalid attempts, i.e. the user failed with a reasonable pronunciation attempt or tried to fool the system, the lattice can be transduced to the actual target phoneme sequence (in-grammar) as well as to an out-of-grammar sequence. The transduction costs in each case can be seen as the probability of the specific word sequence (in-grammar or out-of-grammar) being represented as the corrupted phoneme sequence considering the intended pronunciation and the phoneme error model (phoneme confusion matrix).

The formulas for the transduction probabilities in each case, in-grammar (ig) and out-of-grammar (oog) are:

$$P_{ig} \approx P(p_i|w_{ig})P(p_c|p_i)$$

$$P_{oog} \approx P(p_i|w_{oog})P(p_c|p_i)$$

Where $w_{ig}$ is the in-grammar word sequence and $w_{oog}$ is the out-of-grammar word sequence. The transduction costs can be computed by applying the negative logarithm to the probabilities. The out-of-grammar cost can be computed analogically. For the in-grammar case the cost is computed from the equation:

$$C_{ig} = -\log P_{ig}$$

The smaller the cost value is, the better the phoneme sequence represents the word sequence.

The process of utterance verification uses this transduction cost. When the transduction cost to the target is significantly lower than the transduction cost to the out-of-grammar sequence, the attempt was valid and relatively close to the target. If both costs are about equal, the attempt should not be considered valid. The precise thresholding requires calibration, but the in-grammar vs. out-of-grammar transduction provides the means to sort out invalid pronunciation attempts and abstraction from absolute costs.

An utterance verification experiment was performed on US-English native data. For 7600 utterances in-grammar and out-of-grammar transduction scores were computed. Based on these scores the Equal Error Rate (EER) percentages were calculated. A low EER indicates a good separation of the in-grammar vs. out-of-grammar classes. The EER rate found for the 7600 utterances was about 0.39% which indicates precise separation.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may achieve numerous modifications thereto and changes may be made without departing from the scope and spirit of the invention in its aspects.

What is claimed is:

1. A method comprising:
defining, at a computer, a phoneme lattice for an ideal utterance, the phoneme lattice including a plurality of phoneme instances;
tagging, at the computer, each phoneme instance from the plurality of phoneme instances with a begin time, an end time, and a score;
storing the phoneme lattice at the computer;
determining an ideal path through the phoneme lattice for the ideal utterance;
receiving, at the computer, an input utterance from a user;
transducing the input utterance into the ideal utterance utilizing the phoneme lattice;
calculating, at the computer, an ideal path transduction cost based on the ideal path and the begin time, the end time, and the score of each phoneme instance from the plurality of phoneme instances included in the ideal path;
transducing the input utterance into an out-of-grammar word sequence;
calculating, at the computer, an out-of-grammar transduction cost based on the out-of-grammar word sequence;
determining an accuracy of the input utterance based on the ideal path transduction cost and the out-of-grammar transduction cost; and
sending a signal to output from the computer an indication of the accuracy.

2. The method of claim 1, further comprising:
tagging, at the computer, each phoneme instance of the ideal utterance with an ideal duration;
measuring an actual duration of each phoneme of the input utterance; and
scoring the ideal duration versus the actual duration to produce the score, the determining the accuracy of the input utterance being based on the score.

3. The method of claim 1, wherein the determining accuracy of the input utterance is based on a phoneme confusion matrix.

4. The method of claim 3, wherein the phoneme confusion matrix provides a substitution cost for each phoneme instance from the plurality of phoneme instances included in the ideal path depending on a likelihood that a first phoneme is confused with a second phoneme.

5. The method of claim 1, further comprising:
transforming the phoneme lattice into a directed acyclic graph.

6. The method of claim 1, further comprising:
classifying the input utterance of the user based on a phoneme alignment of the input utterance to the ideal utterance.

7. The method of claim 1, further comprising:
optimizing the transducing the input utterance into the ideal utterance using an accent adjusted acoustic model.

8. The method of claim 1, further comprising:
sending a signal representing an out-of-grammar message if the ideal path transduction cost is outside of a predetermined threshold of the out-of-grammar transduction cost.

9. The method of claim 1, wherein the calculating the out-of-grammar transduction cost is based on a phoneme confusion matrix.

10. The method of claim 1, wherein the calculating the ideal path transduction cost is based on an accent adjusted acoustic model, the calculating the out-of-grammar transduction cost is based on the accent adjusted acoustic model.

11. A non-transitory processor-readable medium storing code representing instructions to be executed by a processor, the code comprising code to cause the processor to:
tag each phoneme instance from a plurality of ideal phoneme instances for an ideal utterance with a begin time, an end time, and a score to generate an ideal phoneme lattice;
determine a target phoneme sequence based on the ideal phoneme lattice for the ideal utterance;
receive an input utterance from a user;
define an input phoneme lattice based on the input utterance;
transduce the input phoneme lattice into the target phoneme sequence;
calculate an ideal path transduction cost of the input utterance based on the begin time, the end time, and the score of each phoneme instance from the plurality of ideal phoneme instances;
tag each phoneme instance from a plurality of out-of-grammar phoneme instances for an out-of-grammar utterance with a begin time, an end time, and a score to generate an out-of-grammar phoneme lattice;
determine an out-of-grammar phoneme sequence based on the out-of-grammar phoneme lattice for the out-of-grammar utterance;
transduce the phoneme lattice of the input utterance into the out-of-grammar phoneme sequence;
calculate an out-of-grammar transduction cost of the input utterance based on the begin time, the end time, and the score of each phoneme instance from the plurality of out-of-grammar phoneme instances; and
send a signal to output from the computer an indication of an accuracy of the input utterance based on the ideal path transduction cost and the out-of-grammar transduction cost.

12. The non-transitory processor readable medium of claim 11, further comprising code to cause the processor to:
verify the input utterance is a valid pronunciation attempt.

13. The non-transitory processor readable medium of claim 11, wherein the code to cause the processor to calculate includes code to cause the processor to calculate the ideal path transduction cost based on a phoneme confusion matrix.

14. The non-transitory processor readable medium of claim 11, further comprising code to cause the processor to:
determine a nativeness of the input utterance based on the ideal path transduction cost.

15. The non-transitory processor readable medium of claim 11, further comprising code to cause the processor to:
classify the input utterance of the user based on a phoneme alignment of the input utterance to the target phoneme sequence.

16. The non-transitory processor readable medium of claim 11, further comprising code to cause the processor to:
transform the ideal phoneme lattice into a directed acyclic graph.

17. The non-transitory processor readable medium of claim 11, further comprising code to cause the processor to:
send a signal representing an out-of-grammar message if the ideal path transduction cost is outside of a predetermined threshold of the out-of-grammar transduction cost.

18. The non-transitory processor readable medium of claim 11, wherein the calculating the out-of-grammar transduction cost is based on a phoneme confusion matrix.

19. The non-transitory processor readable medium of claim 11, wherein the calculating the ideal path transduction cost is based on an accent adjusted acoustic model, the calculating the out-of-grammar transduction cost is based on the accent adjusted acoustic model.

* * * * *